(12) United States Patent
Liu et al.

(10) Patent No.: US 12,414,198 B2
(45) Date of Patent: Sep. 9, 2025

(54) SECONDARY NODE CHANGE METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventors: Yang Liu, Dongguan (CN); Shukun Wang, Dongguan (CN); Cong Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 357 days.

(21) Appl. No.: 17/989,398

(22) Filed: Nov. 17, 2022

(65) Prior Publication Data

US 2023/0085429 A1 Mar. 16, 2023

Related U.S. Application Data

(63) Continuation of application No. PCT/CN2020/122942, filed on Oct. 22, 2020.

(51) Int. Cl.
*H04W 76/30* (2018.01)
*H04W 36/00* (2009.01)
*H04W 74/0833* (2024.01)

(52) U.S. Cl.
CPC ....... *H04W 76/30* (2018.02); *H04W 36/0061* (2013.01); *H04W 36/00692* (2023.05); *H04W 74/0841* (2013.01)

(58) Field of Classification Search
CPC ........... H04W 76/30; H04W 36/00692; H04W 36/0061; H04W 74/0841
See application file for complete search history.

(56) References Cited

U.S. PATENT DOCUMENTS

2020/0245401 A1 7/2020 Ingale et al.
2020/0389823 A1* 12/2020 Xu .......... H04W 76/15
(Continued)

FOREIGN PATENT DOCUMENTS

CN 108990101 A 12/2018
CN 109246745 A 1/2019
(Continued)

OTHER PUBLICATIONS

Extended European Search Report dated Jun. 23, 2023 received in European Patent Application No. EP20958226.1.
(Continued)

*Primary Examiner* — Ajay Cattungal
(74) *Attorney, Agent, or Firm* — Sheppard, Mullin, Richter &Hampton LLP (57) ABSTRACT

Embodiments of the present disclosure provide a secondary node change method, a terminal device, and a network device. The network device can timely know that measurement results of the terminal device meet the secondary node change condition, thereby improving the performance of secondary node change. The secondary node change method includes: receiving, by a master node, first indication information indicating that a secondary node change condition has been met or that a secondary node change process has been initiated by a terminal device; and transmitting, by the master node in response to the first indication information, second indication information to a source secondary node, the second indication information instructing the source secondary node to release a connection towards the terminal device, and/or instructing the source secondary node to terminate data transmission towards the terminal device.

19 Claims, 6 Drawing Sheets

(56) References Cited

U.S. PATENT DOCUMENTS

2022/0030498 A1* 1/2022 Futaki ............... H04W 36/0058
2022/0070959 A1* 3/2022 Jung .................... H04W 24/04
2022/0159530 A1* 5/2022 Kim ................... H04W 36/362

FOREIGN PATENT DOCUMENTS

| CN | 110519777 A | 11/2019 |
|---|---|---|
| CN | 111316695 A | 6/2020 |
| WO | 2018182240 A1 | 10/2018 |
| WO | 2020144917 A1 | 7/2020 |

OTHER PUBLICATIONS

Communication pursuant to Article 94(3) EPC for European Application 20958226.1 mailed Oct. 16, 2024.
International Search Report and Written Opinion dated Jul. 7, 2021 in International Application No. PCT/ CN2020/122942. English translation attached.
3GPP. "Radio Resource Control (RRC) protocol specification (Release 16)" TS 38.331 v16.2.0, Sep. 2020 (Sep. 2020,section 5.5.4, section 5.5.5.1.
Communication pursuant to Article 94(3) EPC for European Application 20958226.1 mailed Apr. 4, 2024.
Office Action issued by the China Patent Office for Application No. 202310176132.9 mailed on Jun. 18, 2025.

* cited by examiner

SECONDARY NODE CHANGE METHOD, TERMINAL DEVICE AND NETWORK DEVICE

CROSS-REFERENCE TO RELATED APPLICATION

The present application is a continuation of International Application No. PCT/CN2020/122942, filed on Oct. 22, 2020, which is hereby incorporated by reference in its entirety.

TECHNICAL FIELD

The embodiments of the present disclosure relate to communication technology, and more particularly, to a secondary node change method, a terminal device and a network device.

BACKGROUND

In a Dual Connectivity (DC) scenario, when a Secondary Node (SN) changes, a Master Node (MN) or a source secondary node will transmit a secondary node change execution condition to a terminal device in a form of measurement identity (ID). A measurement ID is linked to one frequency point and up to two execution events (such as A3 event and A5 event), and only when a signal measured by the terminal device in a source cell and a signal measured in a cell that has a specific physical cell identity (ID) and is corresponding to the above frequency point meet the condition(s) specified by the execution event(s), the terminal device will start to execute the secondary node change process. However, when the secondary node changes, the network device cannot know the exact time at which the measurement results meet the secondary node change condition, which degrades the performance of secondary node change.

SUMMARY

Embodiments of the present disclosure provide a secondary node change method, a terminal device, and a network device. The network device can timely know that the measurement results of the terminal device meet the secondary node change condition, thereby improving the performance of secondary node change.

In a first aspect, a secondary node change method is provided. The method includes: receiving, by a master node, first indication information indicating that a secondary node change condition has been met or that a secondary node change process has been initiated by a terminal device; and transmitting, by the master node in response to the first indication information, second indication information to a source secondary node, the second indication information instructing the source secondary node to release a connection towards the terminal device, and/or instructing the source secondary node to terminate data transmission towards the terminal device.

In a second aspect, a secondary node change method is provided. The method includes: receiving, by a source secondary node, first indication information indicating that a secondary node change condition has been met or that a secondary node change process has been initiated by a terminal device; and releasing, by the source secondary node, a connection towards the terminal device, and/or terminating, by the source secondary node, data transmission towards the terminal device, in response to the first indication information.

In a third aspect, a secondary node change method is provided. The method includes: transmitting, by a terminal device when a secondary node change condition is met, first indication information, or a target random access preamble in a random access procedure. The first indication information indicates that the secondary node change condition has been met or that a secondary node change process has been initiated by the terminal device, and the target random access preamble is used by the terminal device to perform secondary node change.

In a fourth aspect, a network device is provided. The network device is configured to perform the method according to the above first aspect.

In particular, the network device includes one or more functional modules configured to perform the method according to the above first aspect.

In a fifth aspect, a network device is provided. The network device is configured to perform the method according to the above second aspect.

In particular, the network device includes one or more functional modules configured to perform the method according to the above second aspect.

In a sixth aspect, a terminal device is provided. The terminal device is configured to perform the method according to the above third aspect.

In particular, the terminal device includes one or more functional modules configured to perform the method according to the above third aspect.

In a seventh aspect, a network device is provided. The network device includes a processor and a memory. The memory stores a computer program, and the processor is configured to invoke and execute the computer program stored in the memory to perform the method according to the above first aspect.

In an eighth aspect, a network device is provided. The network device includes a processor and a memory. The memory stores a computer program, and the processor is configured to invoke and execute the computer program stored in the memory to perform the method according to the above second aspect.

In a ninth aspect, a terminal device is provided. The terminal device includes a processor and a memory. The memory stores a computer program, and the processor is configured to invoke and execute the computer program stored in the memory to perform the method according to the above third aspect.

In a tenth aspect, an apparatus is provided. The apparatus is configured to perform the method according to any of the above first to third aspects.

In particular, the apparatus includes a processor configured to invoke and execute a computer program from a memory, to cause a device provided with the apparatus to perform the method according to any of the above first to third aspects.

In an eleventh aspect, a computer-readable storage medium is provided. The computer-readable storage medium stores a computer program that causes a computer to perform the method according to any of the above first to third aspects.

In a twelfth aspect, a computer program product is provided. The computer program product includes computer program instructions that cause a computer to perform the method according to any of the above first to third aspects.

In a thirteenth aspect, a computer program is provided. The computer program, when executed on a computer, causes the computer to perform the method according to any of the above first to third aspects.

With the technical solution of the above first aspect, the master node can timely know that the secondary node change condition has been met, and timely instruct the source secondary node to release the connection towards the terminal device, and/or instruct the source secondary node to terminate the data transmission towards the terminal device, so as to reduce the unnecessary consumption of air interface resources between the terminal device and the source secondary node, thereby improving the performance of secondary node change.

With the technical solution of the above second aspect, the source secondary node can timely know that the secondary node change condition has been met, and timely release the connection towards the terminal device, and/or terminate the data transmission towards the terminal device, so as to reduce the unnecessary consumption of air interface resources between the terminal device and the source secondary node, thereby improving the performance of secondary node change.

With the technical solution of the above third aspect, when the secondary node change condition is met, the terminal device indicates to the network device that the secondary node change condition is met, or indicates to the network device that the secondary node change process has been initiated by the terminal device, such that the network device can timely know that the measurement results of the terminal device meet the secondary node change condition, thereby improving the performance of secondary node change.

Alternatively, when the secondary node change condition is met, the terminal device transmits the target random access preamble in the random access procedure, such that the network device can timely know that the measurement results of the terminal device meet the secondary node change condition, thereby improving the performance of secondary node change.

DESCRIPTION OF EMBODIMENTS

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Evolved Universal Terrestrial Radio Access Network (E-UTRAN), Wireless Local Area Networks (WLAN), Wireless Fidelity (WiFi), the $5^{th}$ Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

Optionally, the communication system of an embodiment of the present disclosure may be applied to a Carrier Aggregation (CA) scenario, a Dual Connectivity (DC) scenario, a Standalone (SA) network deployment scenario, and the like.

Optionally, the communication system of an embodiment of the present disclosure may be applied to unlicensed spectrum or shared spectrum. Alternatively, the communication system of an embodiment of the present disclosure may be applied to licensed spectrum or non-shared spectrum.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device. The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a wireless terminal device in self driving, a wireless terminal device in remote medical, a wireless terminal device in smart grid, a wireless terminal device in transportation safety, a wireless terminal device in smart city, or a wireless terminal device in smart home.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

Figure 1:
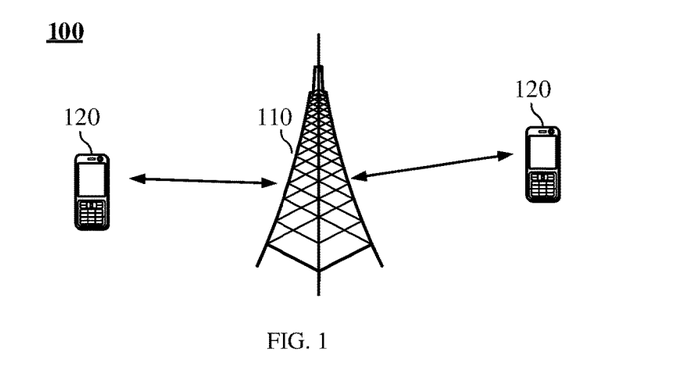
FIG. 1 is a schematic diagram showing a communication system architecture applied by embodiments of the present disclosure.

Exemplarily, a communication system 100 in which an embodiment of the present disclosure can be applied is schematically shown in FIG. 1. The communication system 100 may include a network device 110 which may be a device communicating with a terminal device 120 (or referred to as communication terminal or terminal). The network device 110 may provide communication coverage for a particular geographic area, and may communicate with terminal devices located within the coverage.

FIG. 1 exemplarily shows one network device and two terminal devices. Optionally, the communication system 100 may include multiple network devices, and the coverage of each network device may include other numbers of terminal devices. The embodiment of the present disclosure is not limited to this.

Optionally, the communication system 100 may also include other network entities such as a network controller or a Mobility Management Entity (MME). The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the network device 110 and the terminal device 120 with communication functions. The network device 110 and the terminal device 120 may be the specific devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The terms used in the embodiments of the present disclosure are only provided to explain specific embodiments of the present disclosure, and are not intended to limit the present disclosure. The terms "first", "second", "third" and "fourth" in the description and claims and the drawings of the present disclosure are used to distinguish different objects from each other, rather than describing a specific order. Furthermore, the terms "including" and "having" and any variants thereof are intended to cover non-exclusive inclusion.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

In the embodiment of the present disclosure, "predefinition" may be implemented by pre-storing corresponding codes, tables, or other forms that can be used to indicate related information in devices (for example, including a terminal device and a network device). The present disclosure is not limited to any specific implementation. For example, predefinition may refer to definition in a protocol.

In the embodiment of the present disclosure, "protocol" may refer to a standard protocol in the communication field, for example, including the LTE protocol, the NR protocol, and related protocols to be applied in future communication systems, and the present disclosure is not limited to any of these examples.

To facilitate better understanding of the embodiments of the present disclosure, the secondary node change related to the present disclosure will be described.

Figure 2:
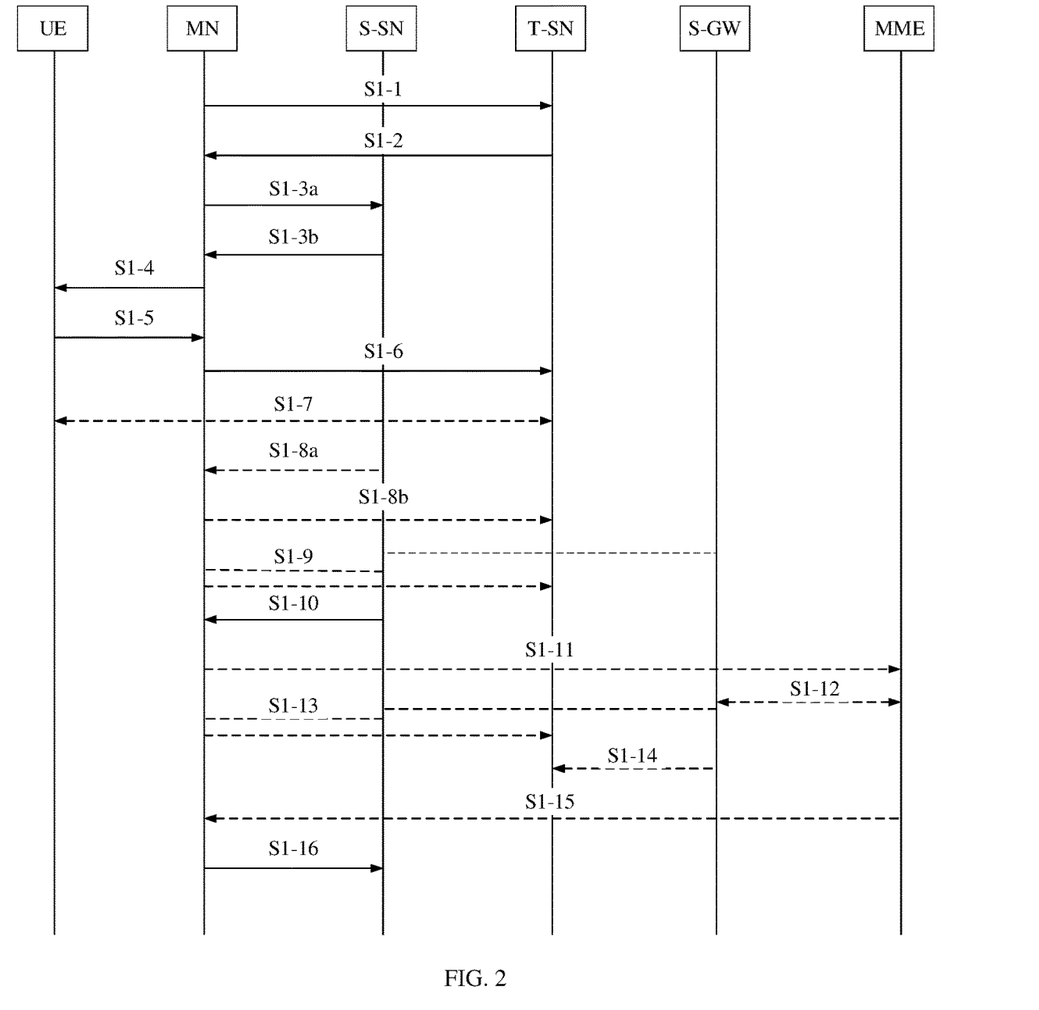
FIG. 2 is a schematic flowchart illustrating an MN-initiated SN change process according to an embodiment of the present disclosure.

An MN-initiated SN change process can be implemented based on a process of S1-1 to S1-16, as shown in FIG. 2.

At S1-1, a Master Node (MN) transmits a secondary base station addition request (SgNB Addition Request) to a target secondary node (T-SN).

At S1-2, the target secondary node (T-SN) transmits a secondary base station addition request acknowledgement (SgNB Addition Request Acknowledge) to the master node (MN).

At S1-3a, the master node (MN) transmits a secondary base station release request (SgNB Release Request) to a source secondary node (S-SN).

At S1-3b, the source secondary node (S-SN) transmits a secondary base station release request acknowledgement (SgNB Release Request Acknowledge) to the master node (MN).

At S1-4, the master node (MN) transmits a Radio Resource Control (RRC) connection reconfiguration message (RRC Connection Reconfiguration) to a terminal (UE).

At S1-5, the terminal (UE) transmits an RRC connection reconfiguration complete message (RRC Connection Reconfiguration Complete) to the master node (MN).

At S1-6, the master node (MN) transmits a secondary base station reconfiguration complete message (SgNB Reconfiguration Complete) to the target secondary node (T-SN).

At S1-7, the terminal (UE) initiates a random access process to the target secondary node (T-SN).

At S1-8a, the source secondary node (S-SN) transmits a secondary node status transfer (SN Status Transfer) to the master node (MN).

At S1-8b, the master node (MN) transmits the secondary node status transfer (SN Status Transfer) to the target secondary node (T-SN).

At S1-9, a Serving GateWay (S-GW) transmits downlink data (Data Forwarding) to the master node (MN).

At S1-10, the source secondary node (S-SN) transmits a secondary Radio Access Technology (RAT) data usage report (Secondary RAT Data Usage Report) to the master node (MN).

At S1-11, the master node (MN) transmits an LTE radio access bearer (E-UTRAN Radio Access Bearer, E-RAB) modification indication (E-RAB Modification Indication) to a Mobility Management Entity (MME).

At S1-12, the Mobility Management Entity (MME) and the Serving Gateway (S-GW) implement Bearer Modification.

At S1-13, the source secondary node (S-SN) transmits an end marker data packet (End Marker Packet) to the target secondary node (T-SN) via the master node (MN).

At S1-14, the serving gateway (S-GW) transmits new path information (New Path) to the target secondary node (T-SN).

At S1-15, the mobility management entity (MME) transmits an E-RAB Modification Confirm to the master node (MN).

At S1-16, the master node (MN) transmits terminal context release information (UE Context Release) to the source secondary node (S-SN).

Figure 3:
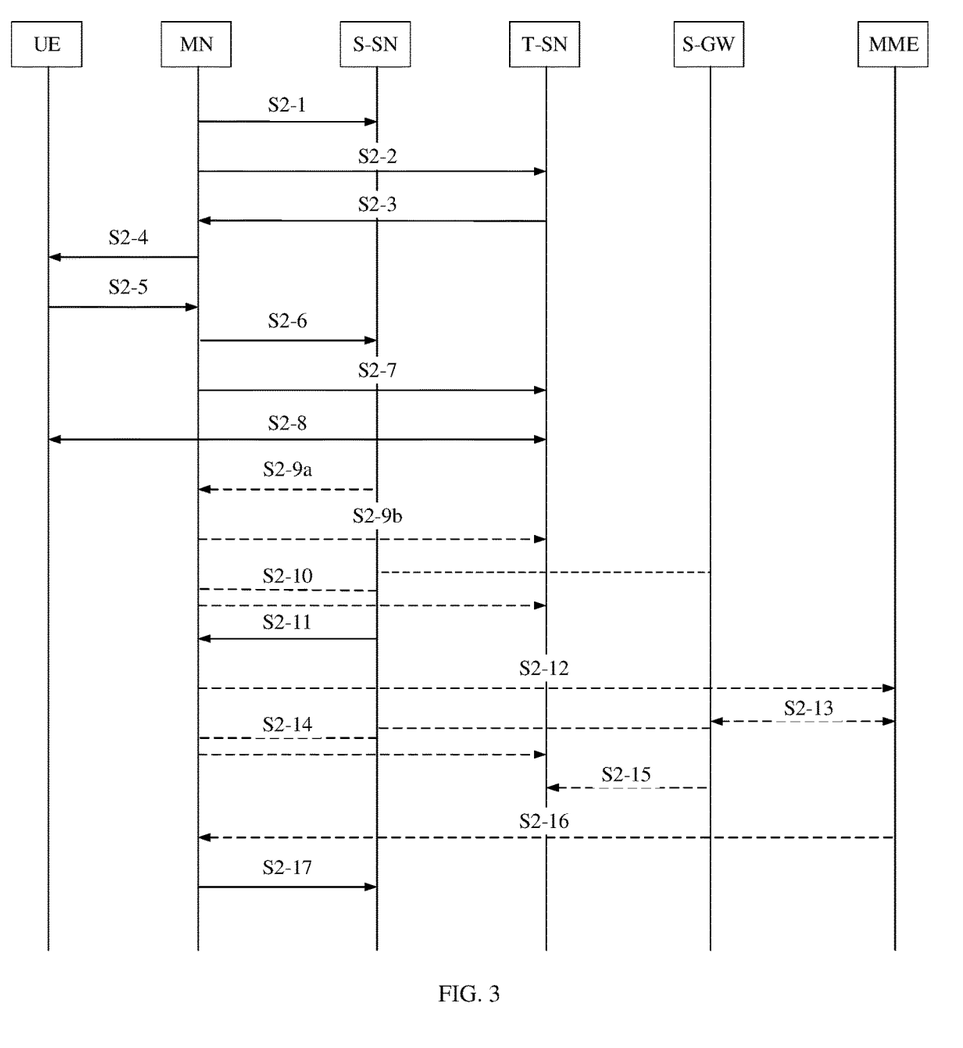
FIG. 3 is a schematic flowchart illustrating an SN-initiated SN change process according to an embodiment of the present disclosure.

An SN-initiated SN change process can be implemented based on a process of S2-1 to S2-17, as shown in FIG. 3.

At S2-1, a source secondary node (S-SN) transmits a secondary base station change request (SgNB Change Request) to a master node (MN).

At S2-2, the master node (MN) transmits a secondary base station addition request (SgNB Addition Request) to a target secondary node (T-SN).

At S2-3, the target secondary node (T-SN) transmits a secondary base station addition request acknowledgement (SgNB Addition Request Acknowledge) to the master node (MN).

At S2-4, the master node (MN) transmits an RRC connection reconfiguration message (RRC Connection Reconfiguration) to a terminal (UE).

At S2-5, the terminal (UE) transmits an RRC connection reconfiguration complete message (RRC Connection Reconfiguration Complete) to the master node (MN).

At S2-6, the master node (MN) transmits a secondary base station change confirm (SgNB Change Confirm) to the source secondary node (S-SN).

At S2-7, the master node (MN) transmits a secondary base station reconfiguration complete message (SgNB Reconfiguration Complete) to the target secondary node (T-SN).

At S2-8, the terminal (UE) initiates a random access process to the target secondary node (T-SN).

At S2-9a, the source secondary node (S-SN) transmits a secondary node status transfer (SN Status Transfer) to the master node (MN).

At S2-9b, the master node (MN) transmits the secondary node status transfer (SN Status Transfer) to the target secondary node (T-SN).

At S2-10, a serving gateway (S-GW) transmits downlink data (Data Forwarding) to the master node (MN).

At S2-11, the source secondary node (S-SN) transmits a secondary RAT data usage report (Secondary RAT Data Usage Report) to the master node (MN).

At S2-12, the master node (MN) transmits an E-RAB Modification Indication to a Mobility Management Entity (MME).

At S2-13, the Mobility Management Entity (MME) and the Serving Gateway (S-GW) implement Bearer Modification.

At S2-14, the source secondary node (S-SN) transmits an end marker data packet (End Marker Packet) to the target secondary node (T-SN) via the master node (MN).

At S2-15, the serving gateway (S-GW) transmits new path information (New Path) to the target secondary node (T-SN).

At S2-16, the Mobility Management Entity (MME) transmits an E-RAB Modification Confirm to the master node (MN).

At S2-17, the master node (MN) transmits terminal context release information (UE Context Release) to the source secondary node (S-SN).

As can be seen from the above FIG. 2, the master node (MN) transmits a secondary base station release request (SgNB Release Request) to the source secondary node (S-SN), such that the source secondary node (S-SN) can terminate the data interaction with the terminal in time and transmit the buffered data to the target secondary node (T-SN) via an Xn interface. As can be seen from the above FIG. 3, when the master node (MN) receives the RRC connection reconfiguration complete message (RRC Connection Reconfiguration Complete) transmitted by the terminal (UE), the master node (MN) transmits a secondary base station change confirm (SgNB Change Confirm) to the source secondary node (S-SN), such that the source secondary node (S-SN) can terminate the data interaction with the terminal in time and transmit the buffered data to the target secondary node (T-SN) via an Xn interface. The reason why the master node (MN) does this is that the master node (MN) clearly knows the time at which the terminal's end data is transmitted, and the operation of releasing the source secondary node (S-SN) will not affect the data transmission throughput of the terminal significantly.

When the secondary node change condition is met, the master node (MN) or the source secondary node (S-SN) transmits a secondary node change execution condition to the terminal device in a form of measurement identity (ID). A measurement ID is linked to one frequency point and up to two execution events (such as A3 event and A5 event), and only when a signal measured by the terminal device in a source cell and a signal measured in a cell having a specific physical cell identity (ID) and corresponding to the above frequency point meet the condition(s) specified by the execution event(s), the terminal device will start to execute the secondary node change process.

When the secondary node change condition is met, the master node (MN) or the source secondary node (S-SN) does not know the exact time at which the measurement results meet the secondary node change condition, so the master node (MN) cannot signal the secondary base station release request (SgNB Release Request) or the secondary base station change confirm (SgNB Change Confirm) to the source secondary node (S-SN) at the proper time.

Based on the above problem, the present disclosure provides a secondary node change scheme, enabling the network to terminate the data transmission between the source secondary node and the terminal in time, so as to reduce the unnecessary consumption of air interface resources and allow transmission of the address for the target secondary node to receive data directed to the terminal device to the source secondary node such that the source secondary node can transmit the data associated with the terminal to the target secondary node in time.

The technical solutions of the present disclosure will be described in detail below with reference to specific embodiments.

Figure 4:
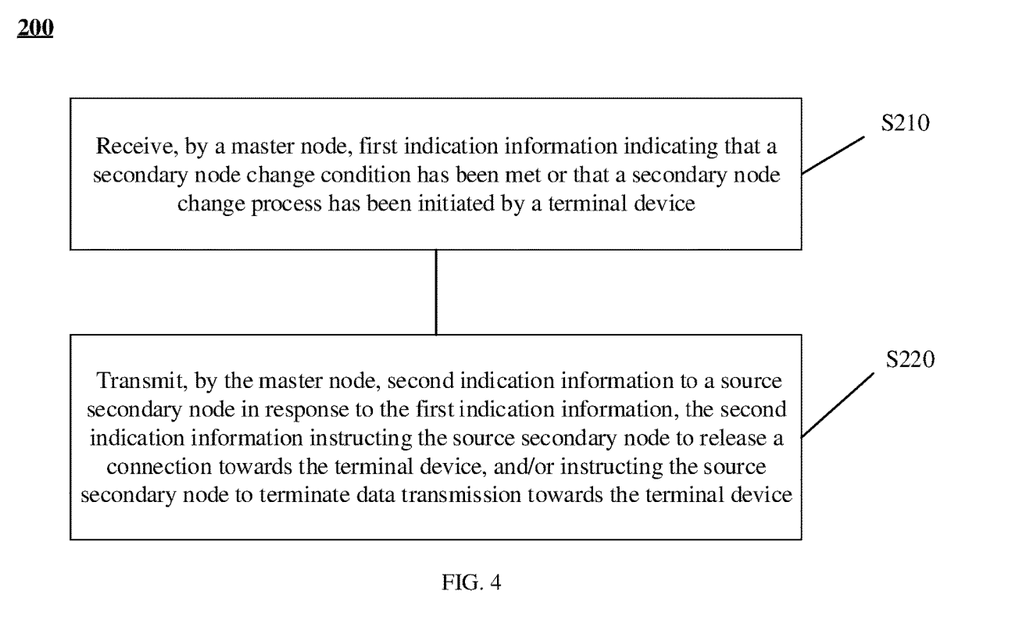
FIG. 4 is a schematic flowchart illustrating a secondary node change method according to an embodiment of the present disclosure.

FIG. 4 is a schematic flowchart illustrating a secondary node change method 200 according to an embodiment of the present disclosure. As shown in FIG. 4, the method 200 may include at least part of the following contents.

At S210, a master node receives first indication information indicating that a secondary node change condition has been met or that a secondary node change process has been initiated by a terminal device.

At S220, in response to the first indication information, the master node transmits second indication information to a source secondary node. The second indication information instructs the source secondary node to release a connection towards the terminal device, and/or instructs the source secondary node to terminate data transmission towards the terminal device.

The embodiment of the present disclosure may be applied to a secondary node change process in a Dual Connectivity (DC) scenario. In addition, the embodiment of the present disclosure may also be applied to a secondary node change process in a Multi-RAT Dual Connectivity (MR-DC) scenario.

Optionally, the second indication information may be secondary node release request information, or secondary node change confirm information. Alternatively, the second indication information may be secondary base station release request information (SgNB Release Request), or secondary base station change confirm information (SgNB change confirm).

Correspondingly, in the embodiment of the present disclosure, after receiving the second indication information, the source secondary node can release the connection towards the terminal device, and/or terminate the data transmission towards the terminal device. Therefore, unnecessary consumption of air interface resources between the terminal device and the source secondary node can be reduced, and the secondary node change process can be completed in time.

In the embodiment of the present disclosure, the master node may receive the first indication information before the terminal device initiates a random access process between the terminal device and a target secondary node (for example, S1-7 in the above FIG. 2, or S2-8 in the above FIG. 3). In this case, the second indication information may be secondary node release request information (for example, S1-3a in the above FIG. 2), or secondary node change confirm information (for example, S2-6 in the above FIG. 3).

In the embodiment of the present disclosure, alternatively, the master node may receive the first indication information after the terminal device initiates a random access process between the terminal device and a target secondary node (for example, S1-7 in the above FIG. 2, or S2-8 in the above FIG. 3.

In some embodiments, when the secondary node changes, the master node (MN) or the source secondary node (S-SN) transmits a secondary node change execution condition to the terminal device in a form of measurement identity (ID). A measurement ID is linked to one frequency point and up to two execution events (such as A3 event and A5 event), and only when a signal measured by the terminal device in a source cell and a signal measured in a cell having a specific physical cell identity (ID) and corresponding to the above frequency point meet the condition(s) specified by the execution event(s), the terminal device will start to execute the secondary node change process.

Optionally, in some embodiments, S210 may include:
receiving, by the master node, the first indication information transmitted by the terminal device. Specifically, when the secondary node change condition is met, the terminal device transmits the first indication information to the master node. Therefore, the master node can timely instruct the source secondary node to release the connection towards the terminal device, and/or instruct the source secondary node to terminate the data transmission towards the terminal device.

Optionally, in some other embodiments, S210 may include:

receiving, by the master node, the first indication information transmitted by a target secondary node. Specifically, when the secondary node change condition is met, the terminal device transmits a target random access preamble to a target secondary node in a random access process. The target random access preamble is used for the terminal device to perform secondary node change. After receiving the target random access preamble, the target secondary node knows that a secondary node change process has been initiated by the terminal device, and the target secondary node transmits the first indication information to the master node. Therefore, the master node can timely instruct the source secondary node to release the connection towards the terminal device, and/or instruct the source secondary node to terminate the data transmission towards the terminal device.

That is, the target secondary node can know that the secondary node change process has been initiated by the terminal device according to the target random access preamble, and/or know that the measurement results of the terminal device meet the secondary node change condition.

Optionally, the target random access preamble may be configured by the network device, pre-configured, or agreed in a protocol.

Optionally, in some embodiments, the master node transmits first information to the source secondary node. The first information includes address information for a target secondary node to receive data directed to the terminal device, and the first information is used by the source secondary node for transmitting buffered data associated with the terminal device to the target secondary node.

Correspondingly, after receiving the first information, the source secondary node may transmit the buffered data associated with the terminal device to the target secondary node according to the address information for the target secondary node to receive data directed to the terminal device.

In an implementation, the master node may transmit the first information to the source secondary node on its own initiative.

In another implementation, the master node may transmit the first information to the source secondary node based on the source secondary node's request. For example, the master node may receive request information transmitted by the source secondary node, and the request information is used to request for the address information for the target secondary node to receive the data directed to the terminal device. In response to the request information, the master node may transmit the first information to the source secondary node.

It should be noted that the information exchange between the master node and the source secondary node may be implemented via an Xn interface.

Therefore, in the embodiment of the present disclosure, the master node can timely know that the secondary node change condition has been met, and timely instruct the source secondary node to release the connection towards the terminal device, and/or instruct the source secondary node to terminate the data transmission towards the terminal device, so as to reduce the unnecessary consumption of air interface resources between the terminal device and the source secondary node, thereby improving the performance of secondary node change.

Figure 5:
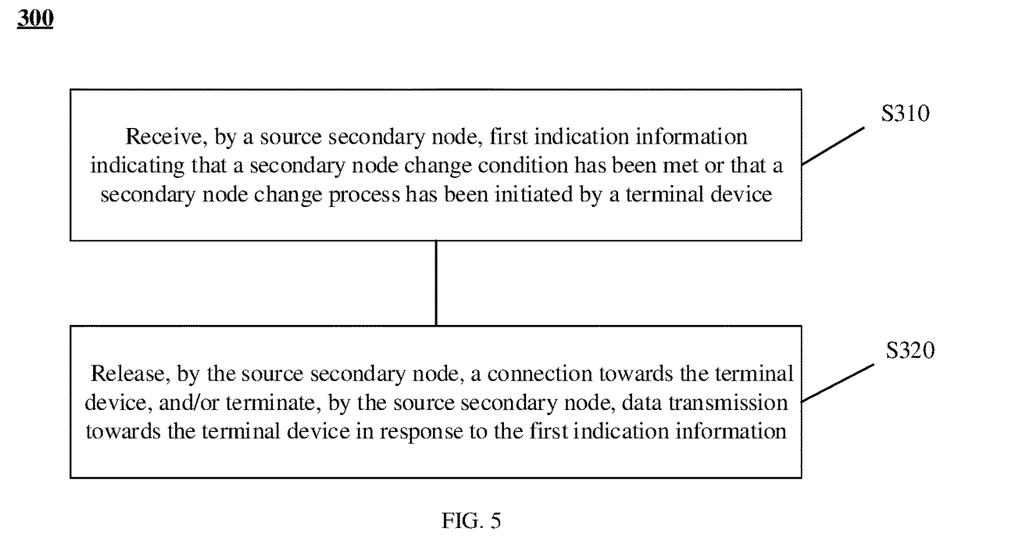
FIG. 5 is a schematic flowchart illustrating a secondary node change method according to another embodiment of the present disclosure.

FIG. 5 is a schematic flowchart illustrating a secondary node change method 300 according to an embodiment of the present disclosure. As shown in FIG. 5, the method 300 may include at least part of the following contents.

At S310, a source secondary node receives first indication information indicating that a secondary node change condition has been met or that a secondary node change process has been initiated by a terminal device.

At S320, in response to the first indication information, the source secondary node releases a connection towards the terminal device, and/or terminates data transmission towards the terminal device.

The embodiment of the present disclosure may be applied to a secondary node change process in a DC scenario. In addition, the embodiment of the present disclosure can also be applied to a secondary node change process in an MR-DC scenario.

In the embodiment of the present disclosure, after receiving the first indication information, the source secondary node releases the connection towards the terminal device, and/or the source secondary node terminates data transmission towards the terminal device. Therefore, unnecessary consumption of air interface resources between the terminal device and the source secondary node can be reduced, and the secondary node change process can be completed in time.

In the embodiment of the present disclosure, the source secondary node may receive the first indication information before the terminal device initiates a random access process with a target secondary node (for example, S1-7 in the above FIG. 2 or S2-8 in the above FIG. 3). Alternatively, the source secondary node may receive the first indication information after the terminal device initiates a random access process with a target secondary node (for example, S1-7 in the above FIG. 2, or S2-8 in the above FIG. 3).

In some embodiments, when the secondary node changes, the master node (MN) or the source secondary node (S-SN) transmits a secondary node change execution condition to the terminal device in a form of measurement identity (ID). A measurement ID is linked to one frequency point and up to two execution events (such as A3 event and A5 event), and only when a signal measured by the terminal device in a source cell and a signal measured in a cell having a specific physical cell identity (ID) and corresponding to the above frequency point meet the condition(s) specified by the execution event(s), the terminal device will start to execute the secondary node change process.

Optionally, in some embodiments, S310 may include:
receiving, by the source secondary node, the first indication information transmitted by the terminal device. Specifically, when the secondary node change condition is met, the terminal device transmits the first indication information to the source secondary node. Therefore, the source secondary node releases the connection towards the terminal device in time, and/or terminates the data transmission towards the terminal device.

Optionally, in some other embodiments, S310 may include:
receiving, by the source secondary node, the first indication information transmitted by a master node. In this case, the first indication information may be secondary node release request information (for example, S1-3a in the above FIG. 2), or secondary node change confirm information (for example, S2-6 in the above in FIG. 3). Specifically, when the secondary node change condition is met, the master node receives specific indication information transmitted by the terminal device. The specific indication information indicates that the secondary node change condition has been met, or that the secondary node change process has been initiated by the terminal device. The master node can timely instruct the source secondary node to release the connection towards the terminal device, and/or instruct the source secondary node to terminate the data transmission towards the terminal device, via the first indication information.

Optionally, in some embodiments, the source secondary node may receive first information transmitted by the master node. The first information includes address information for a target secondary node to receive data directed to the terminal device. The source secondary node transmits buffered data associated with the terminal device to the target secondary node according to the address information for the target secondary node to receive the data directed to the terminal device.

In an implementation, the master node may transmit the first information to the source secondary node on its own initiative.

In another implementation, the master node may transmit the first information to the source secondary node based on the source secondary node's request. For example, the source secondary node may transmit request information to the master node, and the request information is used to request for the address information for the target secondary node to receive the data directed to the terminal device. In response to the request information, the master node may transmit the first information to the source secondary node.

It should be noted that the information exchange between the master node and the source secondary node may be implemented via an Xn interface.

Therefore, in the embodiment of the present disclosure, the source secondary node can timely know that the secondary node change condition has been met, and timely release the connection towards the terminal device, and/or terminate the data transmission towards the terminal device, so as to reduce the unnecessary consumption of air interface resources between the terminal device and the source secondary node, thereby improving the performance of secondary node change.

Figure 6:
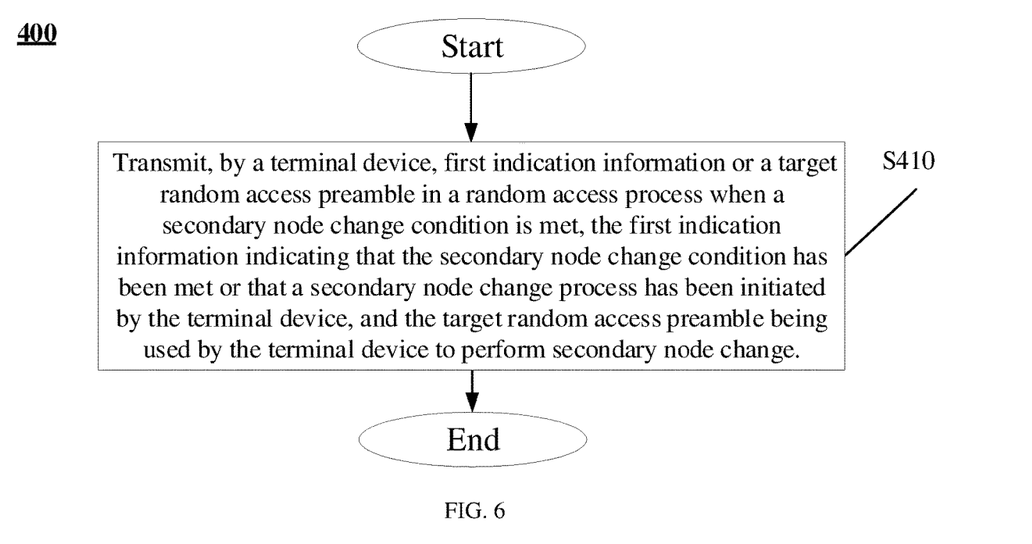
FIG. 6 is a schematic flowchart illustrating a secondary node change method according to yet another embodiment of the present disclosure.

FIG. 6 is a schematic flowchart illustrating a secondary node change method 400 according to an embodiment of the present disclosure. As shown in FIG. 6, the method 400 may include at least part of the following contents:

At S410, when a secondary node change condition is met, a terminal device transmits first indication information, or a target random access preamble in a random access process. The first indication information indicates that the secondary node change condition has been met or that a secondary node change process has been initiated by the terminal device. The target random access preamble is used by the terminal device to perform secondary node change.

The embodiment of the present disclosure may be applied to a secondary node change process in a DC scenario. In addition, the embodiment of the present disclosure can also be applied to a secondary node change process in an MR-DC scenario.

In some embodiments, when the secondary node changes, the master node (MN) or the source secondary node (S-SN) transmits a secondary node change execution condition to the terminal device in a form of measurement identity (ID). A measurement ID is linked to one frequency point and up to two execution events (such as A3 event and A5 event), and only when a signal measured by the terminal device in a source cell and a signal measured in a cell having a specific physical cell identity (ID) and corresponding to the above frequency point meet the condition(s) specified by the execution event(s), the terminal device will start to execute the secondary node change process.

That is, the terminal device obtains the secondary node change condition from the master node or the source secondary node.

Optionally, in some embodiments, S410 may include:
transmitting, by the terminal device, the first indication information to a master node; and/or,
transmitting, by the terminal device, the first indication information to a source secondary node.

Specifically, after the master node receives the first indication information, the master node transmits second indication information to the source secondary node. The second indication information is used to instruct the source secondary node to release the connection towards the terminal device, and/or instruct the source secondary node to terminate data transmission towards the terminal device.

Specifically, after the source secondary node receives the first indication information, the source secondary node can timely release the connection towards the terminal device, and/or terminate the data transmission towards the terminal device.

Optionally, in some embodiments, S410 may include:
transmitting, by the terminal device, the target random access preamble to a target secondary node in the random access process.

Specifically, after receiving the target random access preamble, the target secondary node knows that the terminal device has initiated the secondary node change process, and the target secondary node transmits specific indication information to the master node. The specific indication information indicates that the secondary node change condition has been met, or that the secondary node change process has been initiated by the terminal device. Therefore, the master node can timely instruct the source secondary node to release the connection towards the terminal device, and/or instruct the source secondary node to terminate the data transmission towards the terminal device.

Optionally, the target random access preamble may be configured by the network device, or pre-configured, or agreed in a protocol.

It should be noted that the terminal device transmits the target random access preamble in the random access process, and the receiver can know that the measurement results of the terminal device meet the secondary node change condition based on the target random access preamble.

Therefore, in the embodiment of the present disclosure, when the secondary node change condition is met, the terminal device indicates to the network device that the secondary node change condition has been met, or that that the secondary node change process has been initiated by the terminal device, such that the network device can timely know that the measurement results of the terminal device meet the secondary node change condition, thereby improving the performance of secondary node change.

Alternatively, when the secondary node change condition is met, the terminal device transmits the target random access preamble in the random access process, such that the network device can timely know that the measurement results of the terminal device meet the secondary node change condition, thereby improving the performance of secondary node change.

The method embodiments of the present disclosure have been described in detail above with reference to FIGS. 4 to 6, and the apparatus embodiments of the present disclosure will be described in detail below with reference to FIGS. 7 to 12. It should be understood that the apparatus embodiments and the method embodiments correspond to each other, and for similar description, reference can be made to the method embodiments.

Figure 7:
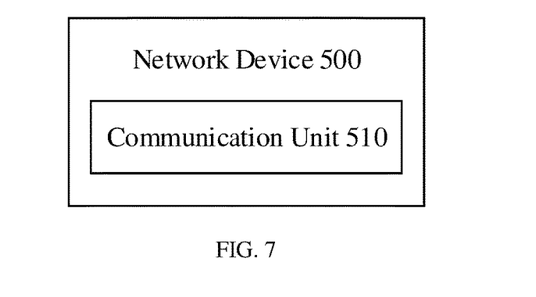
FIG. 7 is a schematic block diagram of a network device according to an embodiment of the present disclosure.

FIG. 7 shows a schematic block diagram of a network device 500 according to an embodiment of the present disclosure. The network device 500 is a master node. As shown in FIG. 7, the network device 500 includes:

a communication unit 510 configured to receive first indication information indicating that a secondary node change condition has been met or that a secondary node change process has been initiated by a terminal device.

The communication unit 510 is further configured to transmit, in response to the first indication information, second indication information to a source secondary node. The second indication information instructs the source secondary node to release a connection towards the terminal device, and/or instructs the source secondary node to terminate data transmission towards the terminal device.

Optionally, the communication unit 510 may be further configured to transmit first information to the source secondary node. The first information includes address information for a target secondary node to receive data directed to the terminal device, and the first information is used by the source secondary node for transmitting buffered data associated with the terminal device to the target secondary node.

Optionally, the communication unit 510 may be further configured to receive request information transmitted by the source secondary node. The request information is used for requesting for the address information for the target secondary node to receive the data directed to the terminal device.

Optionally, the communication unit 510 may be configured to:

receive the first indication information transmitted by the terminal device.

Optionally, the communication unit 510 may be configured to:

receive the first indication information transmitted by a target secondary node.

Optionally, the second indication information may be secondary node release request information, or secondary node change confirm information.

Optionally, in some embodiments, the above communication unit may be a communication interface or a transceiver, or an input/output interface of a communication chip or a system-on-chip.

It should be understood that the network device 500 according to the embodiment of the present disclosure may correspond to the master node in the method embodiment of the present disclosure, and the above and other operations and/or functions of the respective units in the network device 500 are provided for the purpose of implementing the process flow corresponding to the master node in the method 200 shown in FIG. 4, and details thereof will be not omitted here for brevity.

Figure 8:
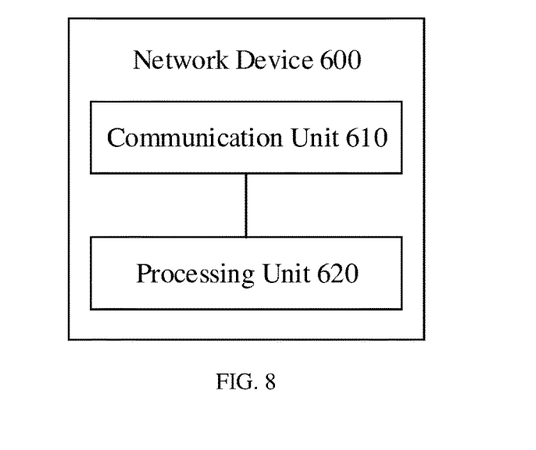
FIG. 8 is a schematic block diagram of a network device according to another embodiment of the present disclosure.

FIG. 8 shows a schematic block diagram of a network device 600 according to an embodiment of the present disclosure. The network device 600 is a source secondary node. As shown in FIG. 8, the network device 600 includes:

a communication unit 610 configured to receive first indication information indicating that a secondary node change condition has been met or that a secondary node change process has been initiated by a terminal device; and a processing unit 620 configured to release a connection towards the terminal device, and/or terminate data transmission towards the terminal device, in response to the first indication information.

Optionally, the communication unit 610 may be further configured to receive first information transmitted by a master node, the first information including address information for a target secondary node to receive data directed to the terminal device; and the communication unit 610 may be further configured to transmit buffered data associated with the terminal device to the target secondary node according to the address information for the target secondary node to receive the data directed to the terminal device.

Optionally, the communication unit 610 may be further configured to transmit request information to the master node, the request information being used for requesting for the address information for the target secondary node to receive the data directed to the terminal device.

Optionally, the communication unit 610 may be configured to:

receive the first indication information transmitted by the terminal device.

Optionally, the communication unit 610 may be configured to:

receive the first indication information transmitted by a master node.

Optionally, in some embodiments, the above communication unit may be a communication interface or a transceiver, or an input/output interface of a communication chip or a system-on-chip. The above processing unit may be one or more processors.

It should be understood that the network device 600 according to the embodiment of the present disclosure may correspond to the source secondary node in the method embodiment of the present disclosure, and the above and other operations and/or functions of the respective units in the network device 600 are provided for the purpose of implementing the process flow corresponding to the source secondary node in the method 300 shown in FIG. 5, and details thereof will be not omitted here for brevity.

Figure 9:
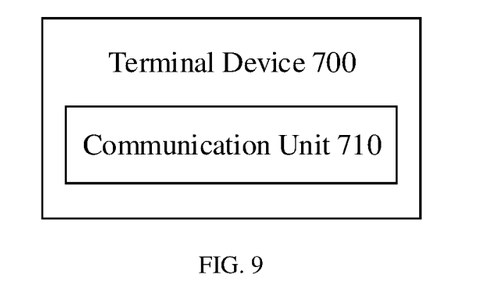
FIG. 9 is a schematic block diagram of a terminal device according to an embodiment of the present disclosure.

FIG. 9 shows a schematic block diagram of a terminal device 700 according to an embodiment of the present disclosure. As shown in FIG. 9, the terminal device 700 includes a communication unit 710.

The communication unit 710 is configured to transmit first indication information, or a target random access preamble in a random access process, when a secondary node change condition is met.

The first indication information indicates that the secondary node change condition has been met or that a secondary node change process has been initiated by the terminal device.

The target random access preamble is used by the terminal device to perform secondary node change.

Optionally, the communication unit 710 may be configured to:

transmit the first indication information to a master node; and/or, transmit the first indication information to a source secondary node.

Optionally, the communication unit 710 may be configured to:

transmit the target random access preamble to a target secondary node in the random access process.

Optionally, the target random access preamble may be configured by a network device, pre-configured, or agreed in a protocol.

Optionally, the communication unit 710 may be further configured to obtain the secondary node change condition from a master node or a source secondary node.

Optionally, in some embodiments, the above communication unit may be a communication interface or a transceiver, or an input/output interface of a communication chip or a system-on-chip.

It should be understood that the terminal device 700 according to the embodiment of the present disclosure may correspond to the terminal device in the method embodiment of the present disclosure, and the above and other operations and/or functions of the respective units in the terminal device 700 are provided for the purpose of implementing the process flow corresponding to the terminal device in the method 400 shown in FIG. 6, and details thereof will be not omitted here for brevity.

Figure 10:
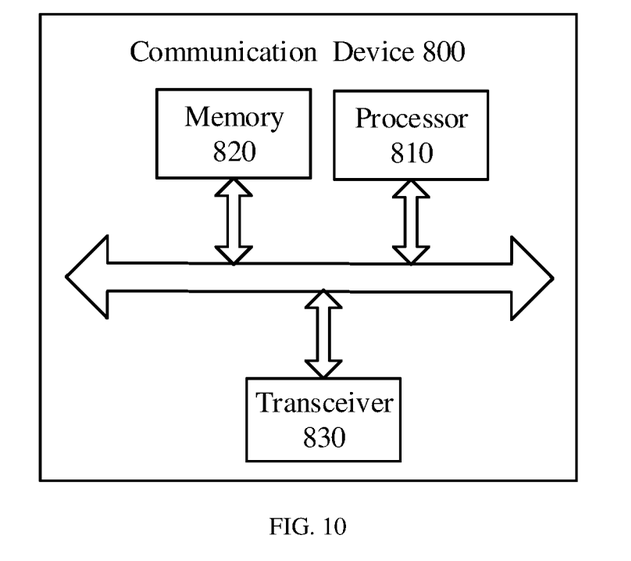
FIG. 10 is a schematic block diagram of a communication device according to an embodiment of the present disclosure.

FIG. 10 is a schematic diagram showing a structure of a communication device 800 according to an embodiment of the present disclosure. The communication device 800 shown in FIG. 10 includes a processor 810, and the processor 810 can invoke and execute a computer program from a memory to implement the method in the embodiment of the present disclosure.

Optionally, as shown in FIG. 10, the communication device 800 may further include a memory 820. The processor 810 can invoke and execute a computer program from the memory 820 to implement the method in the embodiment of the present disclosure.

The memory 820 may be a separate device independent from the processor 810, or may be integrated in the processor 810.

Optionally, as shown in FIG. 10, the communication device 800 may further include a transceiver 830, and the processor 810 may control the transceiver 830 to communicate with other devices, and in particular, transmit information or data to other devices, or receive information or data transmitted by other devices.

Here, the transceiver 830 may include a transmitter and a receiver. The transceiver 530 may further include one or more antennas.

Optionally, the communication device 800 may specifically be the network device according to the embodiment of the present disclosure, and the communication device 800 may implement the corresponding processes implemented by the master node or source secondary node in any of the methods according to the embodiments of the present disclosure. For the sake of brevity, details thereof will be omitted here.

Optionally, the communication device 800 may specifically be the terminal device according to the embodiment of the present disclosure, and the communication device 800 may implement the corresponding processes implemented by the terminal device in any of the methods according to the embodiments of the present disclosure. For the sake of brevity, details thereof will be omitted here.

Figure 11:
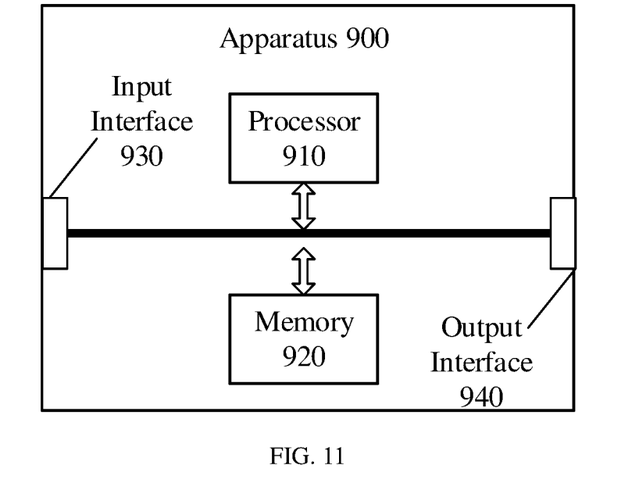
FIG. 11 is a schematic block diagram of an apparatus according to an embodiment of the present disclosure.

FIG. 11 is a schematic diagram showing a structure of an apparatus according to an embodiment of the present disclosure. The apparatus 900 shown in FIG. 11 includes a processor 910, and the processor 910 can invoke and execute a computer program from a memory to implement the method in the embodiment of the present disclosure.

Optionally, as shown in FIG. 11, the apparatus 900 may further include a memory 920. The processor 910 can invoke and execute a computer program from the memory 920 to implement the method in the embodiment of the present disclosure.

The memory 920 may be a separate device independent from the processor 910, or may be integrated in the processor 910.

Optionally, the apparatus 900 may further include an input interface 930. The processor 910 can control the input interface 930 to communicate with other devices or chips, and in particular, obtain information or data transmitted by other devices or chips.

Optionally, the apparatus 900 may further include an output interface 940. The processor 910 can control the output interface 940 to communicate with other devices or chips, and in particular, output information or data to other devices or chips.

Optionally, the apparatus can be applied in the network device in the embodiment of the present disclosure, and the apparatus can implement the corresponding processes implemented by the master node or source secondary node in the various methods of the embodiments of the present disclosure. For the sake of brevity, details thereof will be omitted here.

Optionally, the apparatus can be applied in the terminal device in the embodiment of the present disclosure, and the apparatus can implement the corresponding processes implemented by the terminal device in the various methods of the embodiments of the present disclosure. For the sake of brevity, details thereof will be omitted here.

Optionally, the apparatus in the embodiment of the present disclosure may be a chip, and the chip may also be referred to as a system-level chip, a system-chip, a chip system, or a system-on-chip.

Figure 12:
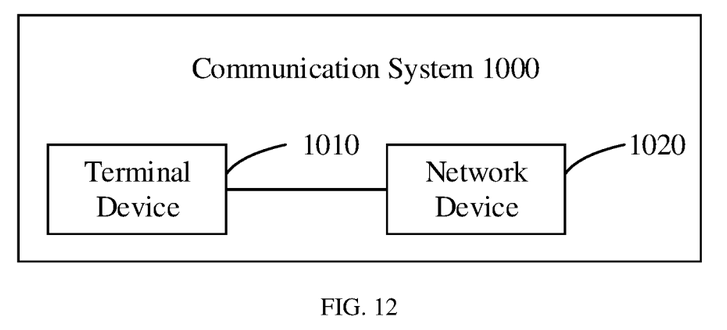
FIG. 12 is a schematic block diagram of a communication system according to an embodiment of the present disclosure.

FIG. 12 is a schematic block diagram showing a communication system 1000 according to an embodiment of the present disclosure. As shown in FIG. 12, the communication system 1000 includes a terminal device 1010 and a network device 1020.

Here, the terminal device 1010 can be configured to implement the corresponding functions implemented by the terminal device in the above method, and the network device 1020 can be configured to implement the corresponding functions implemented by the master node or source secondary node in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium having a computer program stored thereon.

Optionally, the computer readable storage medium can be applied to the network device in the embodiment of the present disclosure, and the computer program can cause a computer to perform corresponding procedures implemented by the master node or source secondary node in the method according to any of the embodiments of the present disclosure. Details thereof will be omitted here for simplicity.

Optionally, the computer readable storage medium can be applied to the terminal device in the embodiment of the present disclosure, and the computer program can cause a computer to perform corresponding procedures implemented by the terminal device in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the master node or source secondary node in the method according to any of the embodiments of the present disclosure. Details thereof will be omitted here for simplicity.

Optionally, the computer program product can be applied to the terminal device in the embodiment of the present disclosure, and the computer program instructions can cause a computer to perform corresponding procedures implemented by the terminal device in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the master node or source secondary node in the method according to any of the embodiments of the present disclosure. Details thereof will be omitted here for simplicity.

Optionally, the computer program can be applied to the terminal device in the embodiment of the present disclosure. The computer program, when executed on a computer, can cause the computer to perform corresponding procedures implemented by the terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the apparatus embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A secondary node change method, comprising:
receiving, by a master node, first indication information indicating that a secondary node change condition has been met or that a secondary node change process has been initiated by a terminal device; and
transmitting, by the master node in response to the first indication information, second indication information to a source secondary node, the second indication information instructing the source secondary node to release a connection towards the terminal device, and/or instructing the source secondary node to terminate data transmission towards the terminal device;
wherein said receiving, by the master node, the first indication information comprises:
receiving, by the master node, the first indication information transmitted by the terminal device.

2. The method according to claim 1, further comprising:
transmitting, by the master node, first information to the source secondary node, the first information comprising address information for a target secondary node to receive data directed to the terminal device, and the first information being used by the source secondary node for transmitting buffered data associated with the terminal device to the target secondary node.

3. The method according to claim 2, further comprising:
receiving, by the master node, request information transmitted by the source secondary node, the request information being used for requesting for the address information for the target secondary node to receive the data directed to the terminal device.

4. The method according to claim 1, wherein said receiving, by the master node, the first indication information further comprises:
receiving, by the master node, the first indication information transmitted by a target secondary node.

5. The method according to claim 1, wherein the second indication information is secondary node release request information, or secondary node change confirm information.

6. A network device, comprising a processor and a memory, wherein the memory has a computer program stored thereon, and the processor is configured to invoke and execute the computer program stored in the memory to perform the method according to claim 1.

7. A non-transitory computer-readable storage medium, storing a computer program that causes a computer to perform the method according to claim 1.

8. A secondary node change method, the method being applied in a communication system including a master node and a source secondary node, and comprising:
receiving, by the master node, first indication information indicating that a secondary node change condition has been met or that a secondary node change process has been initiated by a terminal device;
transmitting, by the master node in response to the first indication information, second indication information to the source secondary node, the second indication information instructing the source secondary node to release a connection towards the terminal device, and/or instructing the source secondary node to terminate data transmission towards the terminal device;
receiving, by the source secondary node, the second indication information; and
releasing, by the source secondary node, the connection towards the terminal device, and/or terminating, by the source secondary node, the data transmission towards the terminal device, in response to the first indication information;
wherein said receiving, by the master node, the first indication information comprises:
receiving, by the master node, the first indication information transmitted by the terminal device.

9. The method according to claim 8, further comprising:
receiving, by the source secondary node, first information transmitted by the master node, the first information comprising address information for a target secondary node to receive data directed to the terminal device; and
transmitting, by the source secondary node, buffered data associated with the terminal device to the target secondary node according to the address information for the target secondary node to receive the data directed to the terminal device.

10. The method according to claim 9, further comprising:
transmitting, by the source secondary node, request information to the master node, the request information being used for requesting for the address information for the target secondary node to receive the data directed to the terminal device.

11. A network device, comprising a processor and a memory, wherein the memory has a computer program stored thereon, and the processor is configured to invoke and execute the computer program stored in the memory to perform the method according to claim 8.

12. A non-transitory computer-readable storage medium, storing a computer program that causes a computer to perform the method according to claim 8.

13. A secondary node change method, comprising:
transmitting, by a terminal device when a secondary node change condition is met, first indication information, wherein
the first indication information indicates that the secondary node change condition has been met or that a secondary node change process has been initiated by the terminal device;
wherein said transmitting, by the terminal device, the first indication information comprises:
transmitting, by the terminal device, the first indication information to a master node.

14. The method according to claim 13, wherein said transmitting, by the terminal device, the first indication information further comprises:
transmitting, by the terminal device, the first indication information to a source secondary node.

15. The method according to claim 13, further comprising:
- transmitting, by the terminal device when the secondary node change condition is met, a target random access preamble in a random access process; wherein the target random access preamble is used by the terminal device to perform secondary node change;
- wherein said transmitting, by the terminal device, the target random access preamble in the random access process comprises:
- transmitting, by the terminal device, the target random access preamble to a target secondary node in the random access process.

16. The method according to claim 15, wherein:
- the target random access preamble is configured by a network device, pre-configured, or agreed in a protocol.

17. The method according to claim 13, further comprising:
- obtaining, by the terminal device, the secondary node change condition from a master node or a source secondary node.

18. A terminal device, comprising a processor and a memory, wherein the memory has a computer program stored thereon, and the processor is configured to invoke and execute the computer program stored in the memory to perform the method according to claim 13.

19. A non-transitory computer-readable storage medium, storing a computer program that causes a computer to perform the method according to claim 13.

* * * * *